US011979034B2

(12) United States Patent
Draak

(10) Patent No.: US 11,979,034 B2
(45) Date of Patent: May 7, 2024

(54) FOREIGN OBJECT DETECTION IN A WIRELESS POWER TRANSFER SYSTEM

(71) Applicant: KONINKLIJKE PHILIPS N.V., Eindhoven (NL)

(72) Inventor: Johannes Wilhelmus Draak, Horst (NL)

(73) Assignee: Koninklijke Philips N.V., Eindhoven (NL)

( * ) Notice: Subject to any disclaimer, the term of this patent is extended or adjusted under 35 U.S.C. 154(b) by 129 days.

(21) Appl. No.: 17/641,166

(22) PCT Filed: Sep. 1, 2020

(86) PCT No.: PCT/EP2020/074260
§ 371 (c)(1),
(2) Date: Mar. 8, 2022

(87) PCT Pub. No.: WO2021/047939
PCT Pub. Date: Mar. 18, 2021

(65) Prior Publication Data
US 2022/0344978 A1    Oct. 27, 2022

(30) Foreign Application Priority Data

Sep. 9, 2019   (EP) ..................... 19196189

(51) Int. Cl.
*H02J 50/00*   (2016.01)
*H02J 50/10*   (2016.01)
(Continued)

(52) U.S. Cl.
CPC .............. *H02J 50/60* (2016.02); *H02J 50/10* (2016.02); *H02J 50/80* (2016.02)

(58) Field of Classification Search
None
See application file for complete search history.

(56) References Cited

U.S. PATENT DOCUMENTS

2015/0364944 A1   12/2015   Garcia Briz et al.
2016/0181818 A1    6/2016   Joye et al.
(Continued)

FOREIGN PATENT DOCUMENTS

EP   3393009 A1   10/2018
EP   3410568 A1   12/2018
(Continued)

OTHER PUBLICATIONS

International Search Report and Written Opinion from PCT/EP2020/074260 dated Jan. 13, 2021.

*Primary Examiner* — Adi Amrany

(57) ABSTRACT

A power transmitter for wirelessly for providing power to a power receiver via an inductive power transfer signal. The power transmitter comprising a power transfer coil for generating the power transfer signal, a driver for generating a drive signal for the power transfer coil, the driver being arranged to, during a power transfer phase, generate the drive signal to employ a repeating time frame comprising at least a power transfer time interval and a transfer foreign object detection time interval, a receiver for receiving a message from the power receiver, a foreign object detector arranged to perform a foreign object detection (FOD) test, a communication coil for generating a communication signal, and a communication unit arranged to generate a communication control signal for the communication coil to provide the communication signal during a communication period, said communication unit being arranged to set the communication control signal to a first value during the communication period and to set the communication control signal to a second value during a communication foreign object detection time interval, the communication foreign object detection time interval occurring during the communication period.

12 Claims, 5 Drawing Sheets

(51) Int. Cl.
*H02J 50/60* (2016.01)
*H02J 50/80* (2016.01)

(56) References Cited

U.S. PATENT DOCUMENTS

2018/0262049 A1    9/2018  Ikefuji et al.
2018/0337528 A1*  11/2018  Taya ...................... H02J 50/12

FOREIGN PATENT DOCUMENTS

| EP | 3528364 | A1 | 8/2019 |
| WO | 2012127335 | A1 | 9/2012 |
| WO | 2015018868 | A1 | 2/2015 |
| WO | 2018219793 | A1 | 12/2018 |

* cited by examiner

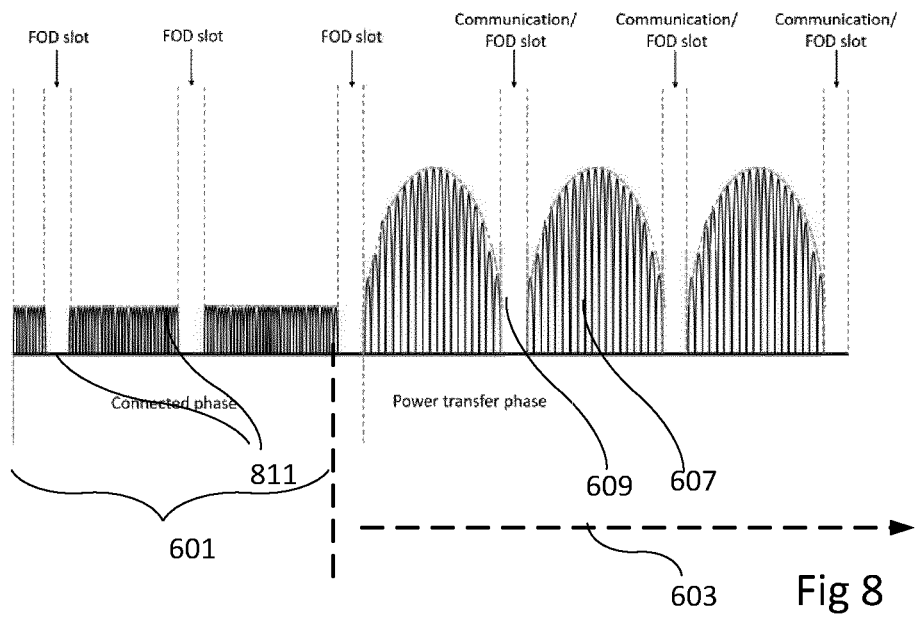
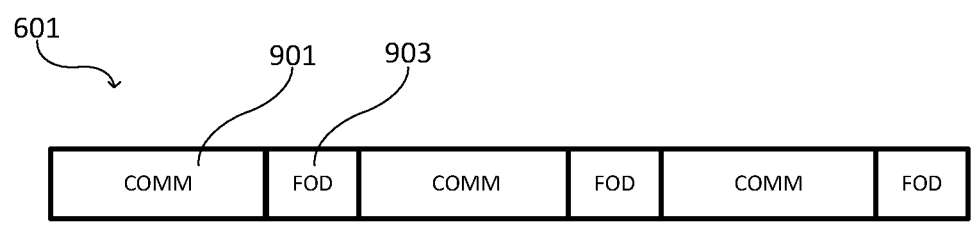
Fig 9
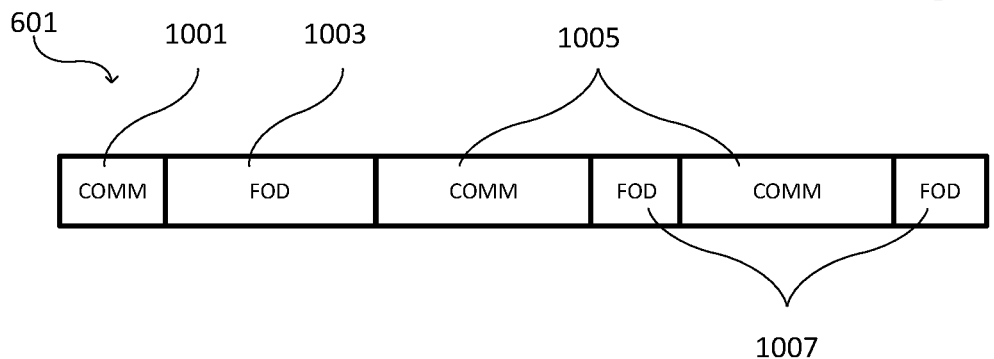
Fig 10

FOREIGN OBJECT DETECTION IN A WIRELESS POWER TRANSFER SYSTEM

CROSS-REFERENCE TO PRIOR APPLICATIONS

This application is the U.S. National Phase application under 35 U.S.C. § 371 of International Application No. PCT/EP2020/074260, filed on Sep. 1, 2020, which claims the benefit of EP Patent Application No. EP 19196189.5, filed on Sep. 9, 2019. These applications are hereby incorporated by reference herein.

FIELD OF THE INVENTION

The invention relates to foreign object detection in a wireless power transfer system and in particular, but not exclusively, to foreign object detection for a power transmitter providing inductive power transfer to higher power devices, such as e.g. kitchen appliances.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter inductor in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index-.html, where in particular the defined Specification documents can be found.

A potential problem with wireless power transfer is that power may unintentionally be transferred to e.g. metallic objects that happen to be in the vicinity of the power transmitter. For example, if a foreign object, such as e.g. a coin, key, ring etc., is placed upon the power transmitter platform arranged to receive a power receiver, the magnetic flux generated by the transmitter coil will introduce eddy currents in the metal objects which will cause the objects to heat up. The heat increase may be very significant and may be highly disadvantageous.

In order to reduce the risk of such scenarios arising, it has been proposed to introduce foreign object detection (FOD) where the power transmitter can detect the presence of a foreign object and reduce the transmit power and/or generate a user alert when a positive detection occurs. For example, the Qi system includes functionality for detecting a foreign object, and for reducing power if a foreign object is detected. Specifically, Qi specification version 1.2.1, section 11 describes various methods of detecting a foreign object.

One method to detect such foreign objects is disclosed in WO2015018868A1. Another example is provided in WO 2012127335 which discloses an approach based on determining unknown power losses. In the approach, both the power receiver and the power transmitter measure their power, and the receiver communicates its measured received power to the power transmitter. When the power transmitter detects a significant difference between the power sent by the transmitter and the power received by the receiver, an unwanted foreign object may potentially be present, and the power transfer may be reduced or aborted for safety reasons. This power loss method requires synchronized accurate power measurements performed by the power transmitter and the power receiver.

For example, in the Qi power transfer standard, the power receiver estimates its received power e.g. by measuring the rectified voltage and current, multiplying them and adding an estimate of the internal power losses in the power receiver (e.g. losses of the rectifier, the receiver coil, metal parts being part of the receiver etc.). The power receiver reports the determined received power to the power transmitter with a minimum rate of e.g. every four seconds. This is commonly referred to as 'power loss accounting'.

The power transmitter estimates its transmitted power, e.g. by measuring the DC input voltage and current of the inverter, multiplying them and correcting the result by subtracting an estimation of the internal power losses in the transmitter, such as e.g. the estimated power loss in the inverter, the primary coil, and metal parts that are part of the power transmitter.

The power transmitter can estimate the power loss by subtracting the reported received power from the transmitted power. If the difference exceeds a threshold, the transmitter will assume that too much power is dissipated in a foreign object, and it can then proceed to terminate the power transfer.

Alternatively, it has been proposed to measure the quality or Q-factor of the resonant circuit formed by the primary and secondary coils together with the corresponding capacitances and resistances. A reduction in the measured Q-factor may be indicative of a foreign object being present.

In practice, it tends to be difficult to achieve sufficient detection accuracy using the methods described in the Qi specification. This difficulty is exacerbated by a number of uncertainties about the specific current operating conditions.

For example, a particular problem is the potential presence of friendly metals (i.e. metal parts of the device that embodies the power receiver or the power transmitter) as the magnetic and electrical properties of these may be unknown (and vary between different devices) and therefore may be difficult to compensate for.

Further, undesirable heating may result from even relatively small amounts of power being dissipated in a metallic foreign object. Therefore, it is necessary to detect even a small power discrepancy between the transmitted and received power, and this may be particularly difficult when the power levels of the power transfer increase.

The Q factor degradation approach may in many scenarios have a better sensitivity for detecting the presence of metal objects. However, it may still not provide sufficient accuracy and e.g. may also suffer from the influence of friendly metal.

The performance of the foreign object detection is subject to the specific operating conditions that are present when the test is actually performed. For example, if, as described in the Qi specification, a measurement for foreign object detection is performed in the Selection Phase of a power transfer initialization process, the signal that the power transmitter provides for the measurement must be small enough to prevent that it wakes up the power receiver. However, for such a small signal, the signal/noise ratio is typically poor, resulting in reduced accuracy of the measurement.

Another issue is that foreign object detection is typically a very sensitive test where it is desired that relatively small changes caused by the presence of a foreign object is detected in an environment with possibly a large variation of the operating conditions and scenarios for which the test is being performed.

Accordingly, current algorithms tend to be suboptimal and may in some scenarios and examples provide less than optimum performance. In particular, they may result in the presence of foreign objects not being detected, or in false detections of foreign objects when none are present.

Given the potentially high power levels such as those that may be used for kitchen appliances, the heating of a foreign object could be quite rapid so it is desirable to detect the presence of such an object as quickly and as reliably as possible.

Hence, an improved object detection would be advantageous and, in particular, an approach allowing increased flexibility, reduced cost, reduced complexity, improved object detection, fewer false detections and missed detections, backwards compatibility, and/or improved performance would be advantageous.

SUMMARY OF THE INVENTION

Accordingly, the Invention seeks to preferably mitigate, alleviate or eliminate one or more of the above mentioned disadvantages singly or in any combination.

Thus there is provided a power transmitter for wirelessly providing power to a power receiver via an inductive power transfer signal, the power transmitter comprising a power transfer coil for generating the power transfer signal, a driver for generating a drive signal for the power transfer coil, the driver being arranged to, during a power transfer phase, generate the drive signal to employ a repeating time frame comprising at least a power transfer time interval and a transfer foreign object detection time interval, a receiver for receiving a message from the power receiver, a foreign object detector arranged to perform a foreign object detection (FOD) test, a communication coil for generating a communication signal, and a communication unit arranged to generate a communication control signal for the communication coil to provide the communication signal during a communication period, said communication unit being arranged to set the communication control signal to a first value during the communication period and to set the communication control signal to a second value during a communication foreign object detection time interval, the communication foreign object detection time interval occurring during the communication period.

Being able to perform foreign object tests during the communication period allows for a detection of a foreign object before the power transfer starts. This reduces the risk of undesirable heating of any foreign objects that might be present. The heating of such objects in the field of high power applications is of particular concern since even small objects can become dangerously hot quite rapidly. The second value may be lower than the first value and may even be set to zero. By setting the second value to zero, the interference of the communication signal with any foreign objects tests is significantly reduced.

In an embodiment, the communication period contains a plurality of communication foreign object detection time intervals, the plurality comprising longer and shorter communication foreign object detection time intervals. The longer communication foreign object detection time intervals are longer than the shorter foreign object detection time intervals.

In in embodiment, the longer FOD time intervals allow for more accurate FOD tests and for calibration, the data of which may be used for later FOD tests. They also provide an opportunity for performing other tests such as coupling coefficient tests. The shorter FOD time intervals may be performed more frequently without interrupting the communication signal too long. Having frequent FOD tests reduces the risk of a foreign object being placed on the power transmitter between FOD.

In an embodiment, the longer communication foreign object detection time interval may have a length of less than or equal to 100 ms and the short communication foreign object detection time interval may have a length of less than or equal to 10 ms, and wherein said communication foreign object detection time intervals occur with a period of 200 ms. These values allow sufficient time to perform the FOD tests whilst maintaining the communication signal.

In an embodiment, there is a first long communication foreign object detection time interval which is completed within 200 ms of an establishment of communication with a power receiver, thus permitting an FOD desirably early.

In an embodiment, the power transmitter is powered by a mains electricity supply having zero-crossing points and the power transfer foreign object detection time interval is synchronized with a zero-crossing point. The zero-crossing point of the mains is a convenient time because the interference from the mains will be lower.

In an embodiment, the first value of the communication signal is set so as to transfer enough power to a communication signal power harvester in the power receiver. In order to power up some basic functions of the power receiver (such as logic for the communications and, were applicable, a user interface), power may be harvested from the communication signal.

In an embodiment, the second value of the communication signal is set so as to reduce interference with a foreign object detection test, since the communication signal may also interfere and reduce the reliability of the FOD test.

In an embodiment, the foreign object detection test is performed using the communication unit because the reduces the amount of hardware.

In an embodiment, the power transmitter is arranged to negotiate the frequency of FOD time intervals during a communication phase with the power receiver. This allows the system to find a possible better trade-off of time spend on FOD tests and having the communication signal on than default values.

There is provided a power receiver for receiving power wirelessly via an inductive power transfer signal comprising a communication coil for receiving a received communication signal, a communication controller arranged to decode the received communications signal and to generate a communication response signal for the communication coil, a communication signal power harvester arranged to extract power from the received communication signal in order to power the communication controller during time intervals where the communication signal is at a first value, and to store a portion of said extracted power sufficient to maintain the communication controller (and the user interface) in an operational state during a communication foreign object detection time interval, a power receiving coil for extracting power from the power transfer signal, and a message transmitter for transmitting a message to the power transmitter. The power receiver is able maintain some of its hardware during the communication FOD time intervals so as to be able to continue cooperation with the power transmitter.

In an embodiment, the communication controller of the power receiver is arranged to maintain a connected state during the communication foreign object detection time interval. This has the advantage that a renegotiation of the communications is not needed at each new communication time interval.

In an embodiment, the power receiver comprises a user interface and is arranged so that the extracted power is sufficient to power the communication controller and user interface with the communication signal having a duty cycle of 66% or less. It is possible that the time used for FOD testing and any other non-communication operations may occupy up to a third of the time of the communication period. It is therefore desirable that the power receiver be able to manage on this.

In an embodiment, the power receiver is arranged to negotiate with the power transmitter about the frequency of foreign object detection time intervals it can support during a communication phase.

There is also provided, a wireless power transfer system comprising a power transmitter for wirelessly providing power to a power receiver via an inductive power transfer signal and a power receiver. The power transmitter comprises a foreign object detector arranged to perform a foreign object detection test, a communication coil for generating a communication signal, a communication unit arranged to generate a communication control signal for the communication coil to provide the communication signal during a communication period, said communication unit being arranged to set the communication control signal to a first value during the communication period and to set the communication control signal to a second value during a first foreign object detection time interval, the first foreign object detection time interval occurring during the communication period, a transmitter coil for generating the power transfer signal, a driver for generating a drive signal for the transmitter coil, the driver being arranged to, during a power transfer phase, generate the drive signal to employ a repeating time frame comprising at least a power transfer time interval and a foreign object detection time interval, and a receiver for receiving a message from the power receiver. The power receiver comprises a communication coil for receiving a received communication signal, a communication controller arranged to decode the received communications signal and to generate a communication response signal for the communication coil, a communication signal power harvester arranged to extract power from the received communication signal in order to power the communication controller, and to store a portion of said extracted power sufficient to maintain the communication controller and the user interface in an operational state, and a message transmitter for transmitting a message to the power transmitter.

There is also provided a method of operating a power transmitter wirelessly providing power to a power receiver via an inductive power transfer signal, the method comprising generating a communication signal, wherein the communication signal is set to a first value during the communication period and to set second value during a first foreign object detection time interval, the first foreign object detection time interval occurring during the communication period, applying the communication signal to a communication field, generating a power transfer signal, generating a drive signal for a transmitter coil, wherein during a power transfer phase, the drive signal employs a repeating time frame comprising at least a power transfer time interval and a second foreign object detection time interval, and performing a foreign object detection test during the first and second foreign object detection time intervals, receiving messages from the power receiver.

There is also provide a method of operating a power receiver for receiving power wirelessly via an inductive power transfer signal, the method comprising receiving a received communication signal via a communication coil, decoding the received communications signal and generating a communication response signal for the communication coil, extracting power from the received communication signal and powering the communication controller and a user interface, and storing a portion of said extracted power sufficient to maintain the communication controller and the user interface in an operational state during a first foreign object detection time interval, extracting power from the power transfer signal using a power transfer coil, and transmitting a message to the power transmitter via the communication coil.

There are also provided computer program products which, when run on a processor located in a wireless power transmitter or power receiver, causes the wireless power transmitter to operate the respective method.

BRIEF DESCRIPTION OF THE DRAWINGS

Embodiments of the invention will be described, by way of example only, with reference to the drawings, in which

FIG. 8 illustrates periods of operation of a wireless power transfer system of FIG. 1 presented as a frame diagram.

FIG. 9 illustrates phases of operation of wireless power transfer system of FIG. 1 in accordance with some embodiments of the invention.

FIG. 10 illustrates periods of operation of a wireless power transfer system of FIG. 1 presented as a frame diagram in accordance with some embodiments of the invention.

DETAILED DESCRIPTION OF THE EMBODIMENTS

The following description focuses on embodiments of the invention applicable to a wireless power transfer system utilizing a power transfer approach such as known from the Qi specification. However, it will be appreciated that the invention is not limited to this application but may be applied to many other wireless power transfer systems.

Figure 1:
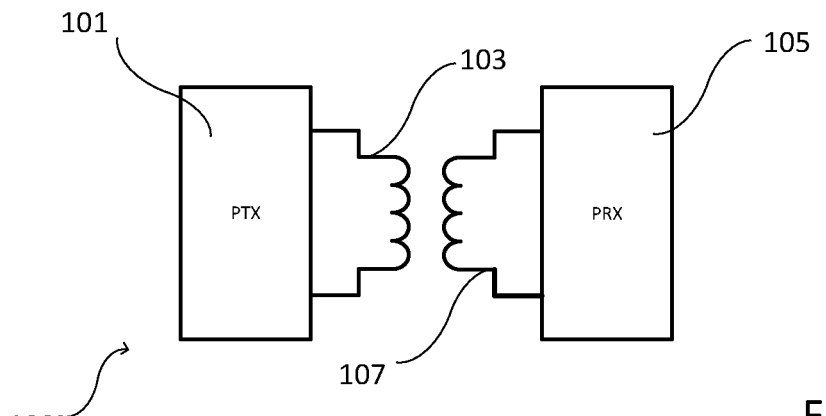
FIG. 1 illustrates an example of elements of a power transfer system in accordance with embodiments.

FIG. 1 illustrates an example of a power transfer system 100 in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system 100 provides an electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may typically have a frequency between around 20 kHz to around 500 kHz, and often for Qi compatible systems typically in the range from 95 kHz to 205 kHz (or e.g. for high power kitchen applications, the frequency may e.g. typically be in the range between 20 kHz to 80 kHz). The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

The system 100 may be arranged to transfer substantial power levels, and specifically the power transmitter 101 may support power levels in excess of 500 mW, 1 W, 5 W, 50 W, 100 W or 500 W in many embodiments. For example, for Qi corresponding applications, the power transfers may typically be in the 1-5 W power range for low power applications (the basic power profile), up to 15 W for Qi specification version 1.2, in the range up to 100 W for higher power applications such as power tools, laptops, drones, robots etc., and in excess of 100 W and up to more than 1000 W for very high power applications, such as e.g. kitchen applications.

In the following, the operation of the power transmitter 101 and the power receiver 105 will be described with specific reference to an embodiment generally in accordance with the Qi Specification (except for the herein described (or consequential) modifications and enhancements) or suitable for the higher power kitchen specification being developed by the Wireless Power Consortium. In particular, the power transmitter 101 and the power receiver 105 may follow, or substantially be compatible with, elements of the Qi Specification version 1.0, 1.1 or 1.2 (except for the herein described (or consequential) modifications and enhancements).

In wireless power transfer systems, the presence of an object (typically a conductive element extracting power from the power transfer signal and not being part of the power transmitter 101 or the power receiver 105, i.e. being an unintended, undesired, and/or interfering element to the power transfer) may be highly disadvantageous during a power transfer. Such an undesired object is in the field known as a foreign object.

A foreign object may not only reduce efficiency by adding a power loss to the operation but may also degrade the power transfer operation itself (e.g. by interfering with the power transfer efficiency or extracting power not directly controlled e.g. by the power transfer loop). In addition, the induction of currents in the foreign object (specifically eddy currents in the metal part of a foreign object) may result in an often highly undesirable heating of the foreign object. This concern is particularly acute when high power levels such as those applicable for kitchen appliances are being used and even small objects can become undesirably hot.

In order to address such scenarios, wireless power transfer systems such as Qi include functionality for foreign object detection. Specifically, the power transmitter 101 comprises functionality seeking to detect whether a foreign object is present. If so, the power transmitter 101 may e.g. terminate the power transfer or reduce the maximum amount of power that can be transferred.

Current approaches proposed by the Qi Specifications are based on detecting a power loss (by comparing the transmitted and the reported received power) or detecting degradations in the quality Q of the output resonance circuit. However, in current use these approaches have been found to provide suboptimal performance in many scenarios, and they may specifically lead to inaccurate detection resulting in missed detections and/or false positives where a foreign object is detected despite no such object being present.

Foreign object detection may be performed before a power receiver enters the power transfer phase (e.g. during the initialization of the power transfer) or during the power transfer phase. Detection during the power transfer phase is often based on comparisons of measured transmitted power and received power whereas detection that take place before the power transfer phase is often based on measurements of a reflected impedance, e.g. by measuring the quality factor of the transmitter coil by using a small measurement signal.

Conventional foreign object detection tends to be suboptimal, partly due to variations and uncertainties in the specific operating conditions and scenarios in which the foreign object detection is performed, including variations and uncertainties in the power transmitter properties, power receiver properties, test conditions applied etc.

An example of the challenges to foreign object detection tests is the requirement to perform sufficiently accurate measurements in order to achieve a sufficiently reliable foreign object detection. This may lead to a desire to generate as powerful a signal as possible in order to increase the detection accuracy. However, this may increase power consumption in the power receiver and in any foreign object present. The detection performance may be sensitive to the specific signal level applied and there will typically be conflicting requirements.

The system of FIG. 1 uses an approach for foreign object detection that seeks to adapt operation to provide improved trade-offs for foreign object detection and facilitate early detection of a foreign object. The approach may in many embodiments provide improved foreign object detection and specifically may in many embodiments provide a more accurate and/or reliable foreign object detection. The approach may further allow low complexity and low resource requirements. An advantage of the approach is that it may be suitable for inclusion in many existing systems, such as specifically in a Qi wireless power transfer system, and indeed that this may often be achieved with few modifications.

As will be described in more detail in the following, the approach utilizes a time division approach during the power transfer phase wherein foreign object detection and power transfer may e.g. be performed in separate time intervals thereby allowing the interference between these (specifically the impact of the power transfer on the foreign object detection) to be reduced substantially. Furthermore, parameters of the generated electromagnetic signal may be adapted to the specific test scenario. This can be achieved through an adaptation process which e.g. may be performed prior to the system entering the power transfer phase.

In the following, the system of FIG. 1 will be described in more detail. In the example, the electromagnetic power transfer signal and the electromagnetic test signal used for the foreign object detection are generated by two different coils (driven by different drivers). Further, the signals will be referred to by different terms, namely the electromagnetic signal generated during power transfer time intervals will be referred to as the power transfer signal and the electromagnetic signal generated during foreign object detection time intervals will be referred to as the electromagnetic test signal, or just the test signal. However, it will be appreciated that in many embodiments, the electromagnetic signal may be generated from the same coil in both the power transfer time interval and the foreign object detection time interval, and indeed the same driver etc. may be used for both the power transfer time interval and the foreign object detection time interval. Indeed, the references to the test signal may in many embodiments be considered equivalent to the power transfer signal during the foreign object detection time interval.

Figure 2:
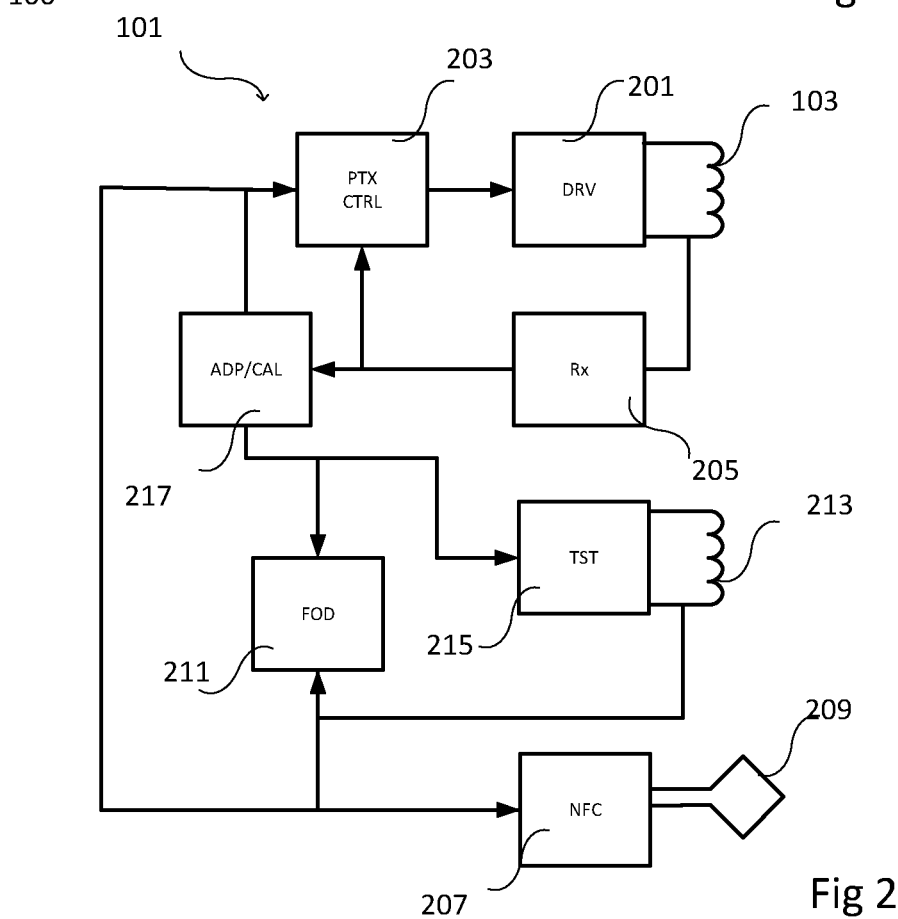
FIG. 2 illustrates an example of elements of a power transmitter in accordance with embodiments.

FIG. 2 illustrates elements of the power transmitter 101 of FIG. 1 in more detail.

The power transmitter 101 includes a driver 201 which can generate a (power transfer) drive signal that is fed to the transmitter coil 103 which in return generates the electromagnetic power transfer signal thereby providing a power transfer to the power receiver 105. The power transfer signal is provided during power transfer time intervals of the power transfer phase.

The driver 201 generates the current and voltage which is fed to the transmitter inductor 103. The driver 201 is typically a drive circuit in the form of an inverter which generates an alternating signal from a DC Voltage. The output of the driver 201 is typically a switch bridge generating the drive signal by the appropriate switching of switches of the switch bridge. It may be understood that there may be other components present such as a matching circuit. These are within the reach of the skilled person and are not discussed here in any detail. The power transmitter 101 further comprises a power transmitter controller 203 which is arranged to control the operation of the power transmitter 101 in accordance with the desired operating principles. Specifically, the power transmitter 101 may include many of the functionalities required to perform power control in accordance with the Qi Specifications.

The power transmitter controller 203 is in particular arranged to control the generation of the drive signal by the driver 201, and it can specifically control the power level of the drive signal, and accordingly the level of the generated power transfer signal. The power transmitter controller 203 comprises a power loop controller controlling a power level of the power transfer signal in response to the power control messages received from the power receiver 105 during the power control phase.

In order to receive data and messages from the power receiver 105, the power transmitter 101 may comprise a message receiver 205 which is arranged to receive data and messages from the power receiver 105 via the power signal. As will be appreciated by the skilled person, a data message may provide one or more bits of information. In some cases, the power receiver 105 is arranged to load modulate the power transfer signal generated by the transmitter coil 103, and the message receiver 205 is arranged to sense variations in the voltage and/or current of the transmitter coil 103 and to demodulate the load modulation based on these. The skilled person will be aware of the principles of load modulation, as e.g. used in Qi wireless power transfer systems, and therefore these will not be described in further detail.

In some embodiments, communication may be performed using a separate communication channel which may be achieved using a separate communication unit 207. In other embodiments, communication may be performed using the transmitter coil 103. In cases where a separate communications unit 207 is used, this may have a communications coil or antenna 209. The communications coil 209 is depicted as a loop antenna though other forms may be suitable and selection is within the abilities of the skilled person. For example, in some embodiments Near Field Communications may be implemented or a high frequency carrier (e.g. with a carrier frequency of 13.56 MHz) may be overlaid on the power transfer signal, using the separate communications unit 207. A communications protocol conforming to some or all of the ISO/IEC 18092 or ISO/IEC 14443 specification may be used.

The power transmitter 101 may further comprise a foreign object detector 211 which is arranged to perform foreign object detection tests, i.e. to specifically detect whether any undesired conductive elements are likely to be present within the generated electromagnetic field. The power transmitter 101 may comprise a test coil 213 which is coupled to a test generator 215 The test generator 215 is arranged to generate a test drive signal for the test coil 213 to provide the electromagnetic test signal during the foreign object detection time interval. The test drive signal is an electrical signal fed to the test coil 213 resulting in the electromagnetic test signal being generated, i.e. the test coil 213 generates a corresponding electromagnetic field with a field strength depending on the test drive signal.

The test generator 215 may comprise substantially the same functionality as the driver 201, e.g. the test generator 215 may comprise a half or full bridge inverter. Indeed, as previously mentioned, in many embodiments, the test generator 215 may be implemented by the driver 201 and the test coil 213 may be implemented by the transmitter coil 103. Accordingly, in the following, all references to test generator 215 and the test coil 213 may as appropriate be considered as references to the driver 201 and the test coil 213 for embodiments where the same coil is used for the generation of both the power transfer signal and the electromagnetic test signal.

The power transmitter may further comprise an adaptor/calibrator 217 which is arranged to determine a suitable value for one or more parameters of the test drive signal. This test drive signal parameter value is then applied during (at least one) foreign object detection time intervals of the power transfer phase.

In some embodiments, the communications unit 207 may also be used for foreign object detection (FOD). In such cases, the test coil 213 and test generator 215 are effectively incorporated into the communications unit 207 and may not be present as separate units. The same coil or antenna may also be used for both communications and FOD in such a configuration. In such embodiments, the foreign object detector 211 communicates with the communications unit 207.

Figure 3A:
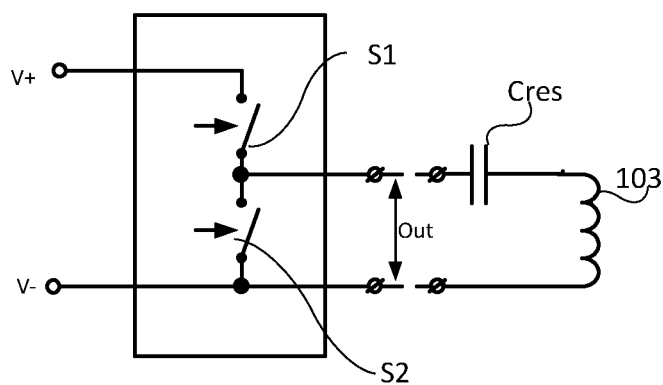
FIGS. 3a and b illustrate examples of a half bridge and full bridge inverters for a power transmitter.

FIG. 3a shows a schematic of a half-bridge switch bridge/inverter as used in embodiments of a power transmitter 101. A DC voltage is applied across the input terminals V+ and V−. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor 103 via a resonance capacitor Cres.

Figure 3B:
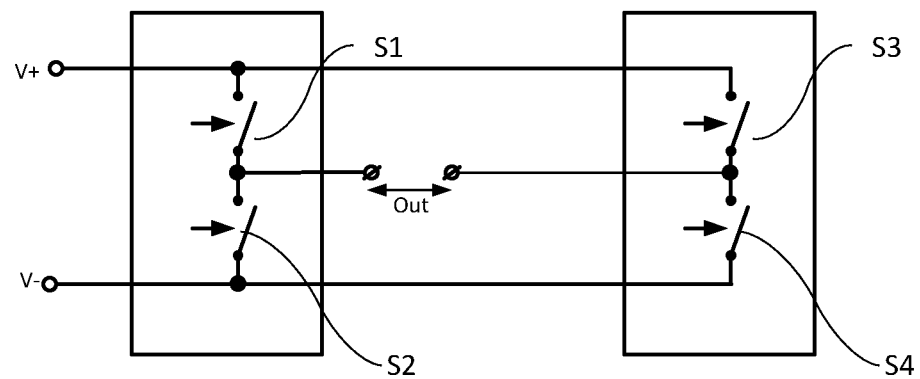

FIG. 3b shows a schematic of a full-bridge switch bridge/inverter as used in embodiments of a power transmitter 101. A DC voltage is applied across the input terminals V+ and V−. In some modes of operation, the switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are opened and closed with the desired frequency. In another mode of operation, S1 and S3 are open and S2 and S4 closed in a part of the time and vice versa. This is often called phase control.

Figure 4:
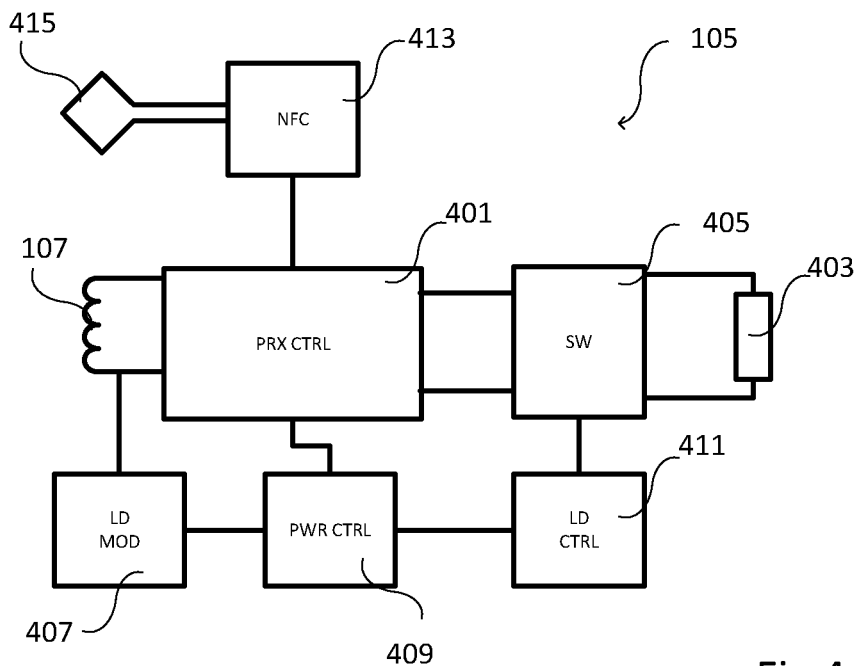
FIG. 4 illustrates a power receiver in accordance with embodiments.

FIG. 4 illustrates some exemplary elements of the power receiver 105 of FIG. 1. The receiver coil 107 is coupled to a power receiver controller 401 which couples the receiver coil 107 to a load 403 via a load output circuit 405. The power receiver controller 401 and load output circuit 405 include a power control path which convert the power extracted by the receiver coil 107 into a suitable supply for the load 403. In addition, the power receiver controller 401 may include various power receiver controller functionality required to perform power transfer, and in particular functions required to perform power transfer in accordance with the Qi specifications.

In order to support communication from the power receiver 105 to the power transmitter 101 the power receiver 105 may comprise a load modulator 407. The load modulator 407 can be arranged to vary the loading of the receiver coil 107 in response to data to be transmitted to the power transmitter 101. The load variations are then detected and demodulated by the power transmitter 101 as will be known to the person skilled in the art.

The power receiver 105 may include a power controller 409 which is arranged to establish a power control loop with the power transmitter 101. Specifically, the power controller 409 can transmit power control messages to the power transmitter 101 and in response the power transmitter 101 may change the power level of the power transfer signal during the power transfer time intervals. Typically, the power controller 409 may generate power control error messages which indicate a request for the power transmitter 101 to increase or decrease the power level. The power controller 409 may determine the appropriate error messages by comparing a measured value to a reference value. During power transfer, the power controller 409 may compare the provided power level with the required power level and request an increased or decreased power level based on this comparison. The power controller 409 may include a message controller which can be arranged to generate suitable messages and control the load modulator such that the power transfer signal is modulated according to the message thereby allowing the power transmitter 101 to detect the transmitted message.

The power receiver 105 may comprise a load controller 411. The load controller may be useful where the power receiver 105 is arranged to enter a reduced power mode during the reduced power time interval(s) of each time frame during the power transfer phase. In the example, the power receiver 105 comprises a load controller 411 which controls the load output circuit 405 (equivalently the ad output circuit 405 can be considered part of the load controller). During a reduced power time interval, the load controller 411 can disconnect the load 403 from the power receiver, i.e. it disconnects a load of the power receiver controller 401, and thus a load of the receiver coil 107. Thus, in this way the load controller 411 may reduce the loading of the receiver coil 107 during the reduced power time interval. Furthermore, not only is the load of the power receiver 105 reduced thereby making it easier to detect other power loss or to detect modulation but often more importantly the power receiver 105 enters a more well-defined or certain state in which the impact of load variations on the electromagnetic test signal is reduced. Also, the load controller could be used as part of a way of performing load modulation.

It will be appreciated that the loading of the receiver coil 107 may not be completely switched off during the foreign object detection interval. For example, the power receiver 105 may still extract power for e.g. operating some internal circuitry. Thus, the load controller 411 may be arranged to disconnect a load from loading the receiver coil 107 while still allowing the receiver coil 107 to be loaded by one or more other loads. Indeed, the loading of the receiver coil 107 can be considered as being comprised of a load which is disconnected by the load controller 411 during the foreign object detection interval and a load which is not disconnected by the load controller 411. Thus, the load 403 can be considered to represent the load that may be disconnected from the receiver coil 107 during the foreign object detection interval. This load may include both an external or internal load for which the power transfer is established but may also include for example internal control functionality temporarily switched off during the foreign object detection interval.

The power receiver 105 may comprise a communication unit 413 and associated communication coil or antenna 415. This may be used to communicate with an equivalent communication unit 207 in a power transmitter 101. The communications coil 415 is depicted as a loop antenna though other forms may be suitable and selection is within the abilities of the skilled person. For example, in some embodiments Near Field Communication may be implemented or a high frequency carrier (e.g. with a carrier frequency of 13.56 MHz) may be overlaid on the power transfer signal. A communications protocol conforming to some or all of the ISO/IEC 18092 or 14443 specifications may be used.

The foreign object detection tests may be based on measurements performed during foreign object detection time intervals. During these foreign object detection time intervals, the power transmitter 101 proceeds to operate in a foreign object detection mode in which an operating condition is set up for the purpose of evaluating whether any foreign objects are present or not.

For example, for embodiments wherein the power transmitter 101 uses different coils for generating the power transfer signal and the electromagnetic test signal, the power transmitter 101 may switch the power transfer signal off completely and set the electromagnetic test signal to a suitable value. In embodiments where the same coil is used to generate the power transfer signal and the electromagnetic test signal, the drive signal for the coil may be changed from an operating point suitable for power transfer to an operating point suitable for foreign object detection. Thus, in many embodiments, a current, voltage, frequency, duty cycle, power or level of the drive signal and thus the power transfer signal and/or the electromagnetic test signal is changed between a power transfer time interval and a foreign object detection time interval. In many embodiments, the power or level of the power transfer signal may be changed from a power level determined by a power transfer control loop function to a power level not determined by (independent of) the power transfer control loop function, such as a previously determined value. In many embodiments, the power or level of the electromagnetic signal may be changed from a first power level to a second power level. The first power level may be a predetermined or nominal level (and specifically may be zero) or may e.g. be determined by the power transfer power control loop. The second power level may be a previously determined level and may be independent of the power transfer power control loop.

During an interval in which foreign object detection is performed, i.e. during a foreign object detection time interval, the foreign object detector 211 thus evaluates conditions to determine whether a foreign object is considered present or not. During the foreign object detection time interval, the power transmitter 101 may generate an electromagnetic test signal and the foreign object detection is based on evaluating characteristics and properties of this signal.

For example, the power level of the test drive signal may reflect the power extracted from the generated electromagnetic test signal and this may be used as an indication of the power being extracted by potential foreign objects (typically by comparing it to the expected power extraction from the power receiver 105). The power level of the electromagnetic test signal reflects the power that is extracted from the electromagnetic test signal by conductive elements (including the receiver coil 107) in the electromagnetic field. It thus indicates the power extracted by the combination of the power receiver 105 as well as any foreign objects that may be present. The difference between the power level of the electromagnetic signal and the power extracted by the power receiver 105 accordingly reflects the power extracted by any foreign objects present. The foreign object detection may for example be a low complexity detection. For example, a detection of a foreign object may be considered to have occurred if the difference between the power level of the electromagnetic signal (henceforth referred to as transmit power level) exceeds the reported power extracted by the power receiver 105 (henceforth referred to as received power level).

In the approach, the foreign object detection is accordingly based on a power level comparison between a transmitted power level and a reported received power level. The reaction to a detection of a foreign object may be different in different embodiments. However, in many embodiments, the power transmitter 101 may be arranged to terminate a power transfer (at least temporarily) in response to a detection of a foreign object.

Figure 5:
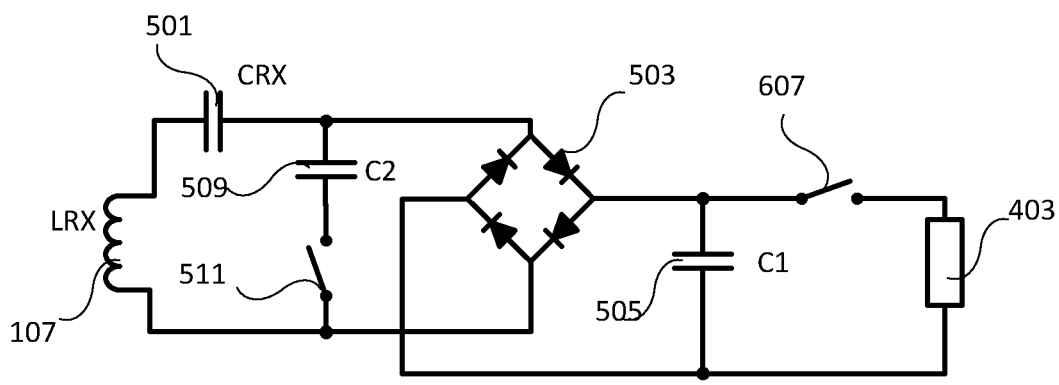
FIG. 5 illustrates an example of elements of a power receiver in accordance with embodiments.

FIG. 5 illustrates a circuit diagram of elements of an example of a power path of the power receiver 105. In the example, the power receiver 105 comprises the receiver coil 107 referred to by the designation LRX. In the example, receiver coil 107 is part of a resonance circuit and the power receiver 105 accordingly also includes a resonance capacitor 501 (CRX). The receiver coil 107 is subjected to the electromagnetic signal and accordingly an AC voltage/current is induced in the coil. The resonance circuit is coupled to a rectifier bridge 503 with a smoothing capacitor 505 (C1) coupled to the output of the bridge. Thus, a DC voltage is generated over the capacitor 505. The magnitude of the ripple on the DC voltage will depend on the size of the smoothing capacitor as well as on the load.

The bridge 503 and smoothing capacitor 505 are coupled to the load 403 via a switch 607. It will also be appreciated that the load 403 is illustrated as a simple passive resistor but that it may of course be any suitable load. For example, the load 403 may be a battery to be charged, a mobile phone, or another communication or computational device, may be a simple passive load etc. Indeed, the load 403 need not be an external or dedicated internal load but may for example include elements of the power receiver 105 itself. Thus, the load 403 illustrated in FIGS. 4 and 5 may be considered to represent any load of the receiver coil 107/the electromagnetic signal.

FIG. 5 further shows a load modulation capacitor 509 (C2) which can be connected or disconnected in parallel to the resonance circuit based on the switching of a switch 511. The load modulator 407 or the message controller 409 may be arranged to control the switch 511 such that the load of the modulation capacitor C2 can be connected and disconnected in response to data to be transmitted to the power transmitter 101 thereby providing load modulation.

Figure 6:
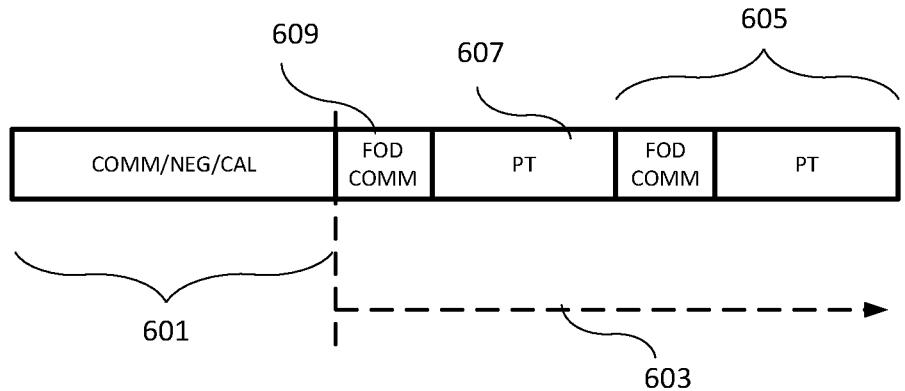
FIG. 6 illustrates a time frame for operations of the system in accordance with embodiments.

FIG. 6 illustrates, figuratively, periods of time of a power transfer process. The power transfer may have two phases, a communication phase 601 (annotated as "comm/neg/cal") and a power transfer phase 603.

During the communication phase 601, the power transmitter 101 and power receiver 105 establish communications and perform negotiations concerning their respective requirements and capabilities. Such a phase is described in the Qi specifications. They may also perform calibration routines which may be used during subsequent operations, During the power transfer phase 603, the system 101 applies a repeating time frame 605, where the time frame 605 comprises at least one power transfer time interval 607 and one foreign object detection time interval 609. Power transfer time intervals are indicated by PT and foreign object detection time intervals are indicated by FOD/COMM. In the example, each time frame 605 comprises only one FOD time interval 609 and one power transfer time interval 607 and these (as well as the time frame itself) have the same duration in each frame. The FOD time interval 609 may also be used for communication. It will be appreciated that in other embodiments, other time intervals may also be included in a time frame (such as e.g. separate communication intervals) or a plurality of foreign object detection time intervals and/or power transfer time intervals may be included in each time frame. In particular, some time frames may include an adaptation or calibration time interval to allow for calibration of the FOD system (211, 215, 207). Furthermore, the duration of the different time intervals (and indeed the time frame itself) may in some embodiments vary dynamically. It will also be appreciated that the lengths of the periods as shown imply no proportionality between the various intervals.

In the approach, the foreign object detection and the power transfer is thus separated in the time domain thereby resulting in reduced cross-interference from the power transfer to the foreign object detection. Thus, the variability and uncertainty resulting from variations in the operating conditions for the power transfer can be isolated from the foreign object detection resulting in a more reliable and accurate foreign object detection.

In the power transfer time interval 607, the power transmitter is thus arranged to perform power transfer during the power transfer time interval of the time frames of the power transfer phase. Specifically, during these time intervals, the power transmitter 101 and the power receiver 105 may operate a power control loop (the power control loop may be based on communication within the power transfer signal time interval or may e.g. be based on communication outside of the power transfer signal time interval, such as in dedicated communication time intervals. For example, each FOD time interval 609 may be separated by a plurality of alternating power transfer signal time intervals 607 and communication time intervals). Thus, the level of the power being transferred may be dynamically varied. In the foreign object detection time intervals 609 of the time frames of the power transfer phase, at least one parameter of the drive signal, and thus of the electromagnetic test signal, may be set to a value determined during an adaptation operation performed prior to the foreign object detection time interval. Thus, in the foreign object detection time interval, the parameter may be set to a predetermined value (i.e. being determined prior to the foreign object detection time interval, and often prior to the power transfer phase). In contrast, the parameter may not be constrained to this predetermined value during power transfer time intervals.

For example, during a power transfer time interval 607, the system may operate a power control loop which allows the power level of the power transfer signal to be varied in response to power control messages from the power receiver. The power control loop may control/vary at least one of a current, voltage, and frequency of the drive signal/power transfer signal. In contrast, during a FOD time interval 609, the parameter varied by the power control loop during the power transfer time interval may be set to a predetermined value determined prior to the power transfer phase.

It may be convenient for the power receiver 105 to reduce the load during FOD time intervals 609 which occur during the power transfer phase 603.

In embodiments where the same coil is used for both the power transfer signal and the electromagnetic test signal, the power transmitter may be arranged to reduce the level of the power transfer signal during the foreign object detection time interval relative to the power transfer time interval. In many situations, the power level of the power transfer signal may be allowed to increase to high levels, such as e.g. to levels of 10-100 W, or even substantially higher in many applications (e.g. for power transfer to kitchen appliances). However, during a foreign object detection time interval, the power level of the generated electromagnetic signal may be reduced to a predetermined level that is much lower than the current or maximum allowable power during the power transfer time interval. For example, the power level may be set to a predetermined level not exceeding 1 W.

In high power applications (e.g. for power transfer to kitchen appliances) even where a dedicated FOD system is used, it may be advantageous to reduce the power transfer signal. It is desirable that the FOD system be sensitive in order to detect even small objects. Where the FOD system uses a technique requiring an electromagnetic field (such as a Q-factor change), the presence of a large power signal (i.e. strong magnetic field) would require the FOD system to have a high dynamic range in order to still be able to detect the weak signal of the foreign object. The strong power signal might also reduce the signal to noise ratio (SNR) of the FOD test. Where a power-loss accounting method is used, it may be difficult to detect accurately differences in absorbed power when a large power signal is present i.e. when large amounts of power are being transferred because those differences may not be large compared to measurement errors. Thus, the power level may be set to zero or very close to zero.

Figure 7:
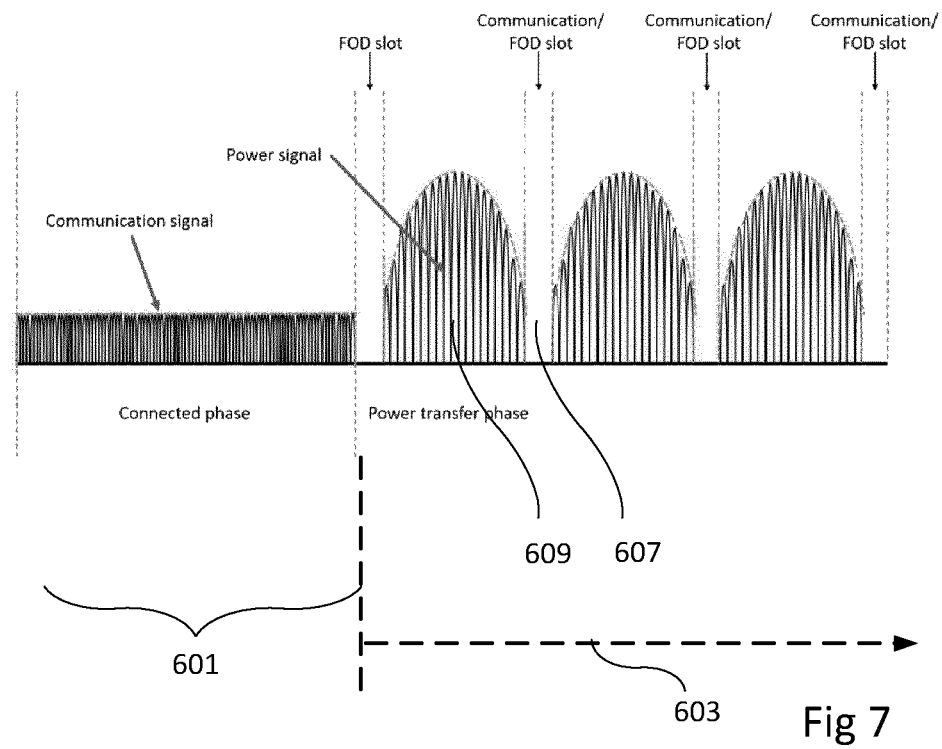
FIG. 7 illustrates phases of operation of wireless power transfer system of FIG. 1.

FIG. 7 illustrates the time intervals and signals in a high power application such as with a kitchen appliance. In this particular example, the power transmitter 101 is provided with an AC mains supply. During power transfer intervals 709, the power signal has an envelope which follows that of a rectified version the mains supply. As is illustrated, the switching circuit of FIGS. 3a and 3b is operated at a higher frequency than the mains frequency. FOD intervals 707 are positioned at (or synchronized with) the zero-crossing points. The FOD intervals 707 may be centered on the zero-crossing points with an interval either side. The zero-crossing point of the mains is a convenient time because the interference from the mains will be lower. A possible time width for the FOD intervals is 1.6 ms which should be sufficient to allow time for the FOD tests and any communication. However other widths may be preferable, depending on the detail of the system and the skilled person will be able to make this determination. During the FOD intervals, the power signal may be maintained at zero or below a level where the magnetic field will not interfere with the FOD tests to any unacceptable level. Since most of the power is transferred at high power levels, it may be more convenient to set the power signal to zero during the FOD intervals.

In addition to applying the time frame comprising specific foreign object detection time intervals, the system may also apply an approach wherein the value of one or more parameters (or properties) of the test signal is adapted based on an adaptation process which in many embodiments may be performed prior to the power transfer phase. This adaptation process thus determines a preferred value for one or more of the parameters/properties of the electromagnetic test signal prior to the power transfer phase and then applies this preferred value during the foreign object detection time intervals of the subsequent power transfer phase. In some embodiments, the adaptation process may be repeated, e.g. at regular intervals, during the power transfer phase.

Where the power transmitter 101 comprises a dedicated FOD unit, the power transmitter 101 may comprise an adaptor/calibrator 217 which is arranged to determine a test drive signal parameter value during an adaptation time interval which may be performed during the power transfer phase and/or prior to the power transfer phase.

In the case of a high power application, the potential heating of a foreign object may be significant even in just the first few power transfer intervals 607 of a power transfer phase 603. Therefore, it is desirable to detect any foreign objects as quickly as possible—indeed before the power transfer phase 603 starts. Whilst the power transfer phase 603 may be started with a FOD time interval 609, this may be desirable to improve the security of the system in that there is a risk that the FOD test misses a foreign object, particularly if it is small, and allows the power transfer to continue. It is understood that all measurement methods have errors and noise limitations and that these may contribute to causing false negatives.

FIG. 8 illustrates time intervals and signals in a power transfer system 101 according to an embodiment. As before, a communication phase precedes a power transfer phase 603. In the power transfer phase 603, there are repeating time frames comprising power transfer intervals 607 and FOD time intervals 609. Additionally, there may be FOD time intervals (or slots) 811 during the communication phase 601.

FIG. 9 illustrates time intervals during a communication phase 601 according to an embodiment. The communication phase 601 comprises a series of communication time intervals 901 and FOD time intervals 903. Performing FOD tests during the communication phase allows an earlier detection of a foreign object. Also, having more FOD testing opportunities before the power transfer starts decreases the risk of missing a foreign object. It may be advantageous to have multiple FOD time intervals 903 during the communication phase 601.

It can be understood that the communication phase may actually be quite long by virtue of the behavior of the user (as opposed the requirements of the system). In many cases for high power applications (such as kitchen appliances), the user may place the appliance (the power receiver 105) on the power transmitter 101 without immediately trying to switch the high power on. This presents a further opportunity for repeated FOD tests and it may be advantageous to keep repeating the FOD tests until the user does something to start the power transfer phase 603. Indeed, this may be advisable in that it caters for the situation where a foreign object is introduced after the first FOD tests but before the power transfer phase 603. Indeed, it may be desirable to perform as many as 5 FOD tests per second during the communication phase 601. The added benefit of having more than 10 FOD tests per second is less.

The field used for the communications (e.g. NFC) may also interfere to some extent with FOD testing, for example degrading the SNR of the measurement. Therefore, it may be desirable to remove the communication signal (field) during the FOD time intervals. Removing the communication signal may itself, cause problems, however. The power receiver is relying on this signal for powering its communication circuitry (since the power signal is not yet established). Removing the signal for too long may cause instability or powering down of active parts of the receiver, and the communication may have to be reinitiated as consequence. As will also be appreciated, communication is also not possible whist the communication signal is not present, either. 'Removing the signal' may consist of reducing the signal power and less than one percent of the level used during communications may be enough to keep the interference with the FOD test down to acceptable levels.

During the communication phase 601, there will need to be a certain amount of circuitry and hardware powered up and this without any power having been transferred via the main power transfer system (i.e. coils 103, 107 and the associated hardware). Such circuitry may be the communication unit 413 and that part of the logic of the power receiver controller 401 which is needed for the tasks of negotiation, timing of intervals and decisions. There may be a user interface (which may be as simple as coloured LEDs) and it may be convenient to power up at least some of this. Where NFC is used for the communication, it may be possible to harvest (or extract) some of the energy of the NFC field and use this to power the aforementioned hardware. Since the NFC field may be removed (or at least significantly reduced) during FOD time intervals, the energy harvesting hardware of the power receiver 105 (which may be conveniently incorporated into the communication unit 413, where present) should be able to harvest enough energy and store it so as to be able to keep the required hardware powered during the FOD time intervals 903. It is possible that the communication signal (field) may only be present 66% of the time. Therefore, it would be advantageous for the energy harvester of the power receiver 105 to be able to keep the required hardware powered using a communication field with less than a 66% duty cycle. It may be convenient for the power receiver 105 to be able to signal the power transmitter 101 in order to have it increase or decrease the power in the communication signal. This assumes that the power transmitter's communication unit 207 is providing the communication signal. In the case of a protocol conforming to one of the aforementioned ISO/IEC standards, the power adjustment could be done when the power transmitter's communication unit 207 initiates communication by providing the communication field and performing a READ command.

It may be possible to assist the power receiver to remain powered in a stable manner to some extent by providing a capacitor in the receiver. However, it is desirable to keep the value of this to a minimum because this will present a load itself during periods when there is power thus 'taking power from the rest of the power receiver i.e. more power needs to be transferred than if there were only the receiver to be powered. A very large capacitor also brings size and cost penalties. Thus there is a trade-off to be made.

Thus there is a power transmitter 101 for wirelessly providing power to a power receiver 105 via an inductive power transfer signal, the power transmitter 101 comprising a foreign object detector 207, 215 arranged to perform a foreign object detection test, a communication coil 209 for generating a communication signal, a communication generator 207 arranged to generate a communication control signal for the communication coil 209 to provide the communication signal during a communication period, said communication generator 207 being arranged to set the communication control signal to a first value during the communication period and to set the communication control signal to second value during a communication foreign object detection time interval, the communication foreign object detection time interval occurring during the communication period, a power transfer coil 103 for generating the power transfer signal, a driver 201 for generating a drive signal for the power transfer coil 103, the driver 201 being arranged to, during a power transfer phase, generate the drive signal to employ a repeating time frame comprising at least a power transfer time interval and a transfer foreign object detection time interval, and a receiver 205, 207 for receiving messages from the power receiver 105. The power receiver 105 is arranged for receiving power wirelessly via an inductive power transfer signal; the power receiver 105 comprising a communication coil 107 for receiving a received communication signal, a communication controller 413, 407, 409 arranged to decode the received communications signal and to generate a communication response signal for the communication coil 415, 407, a communication signal power harvester 413, 107, arranged to extract power from the received communication signal in order to power the communication controller and a user interface during time intervals where the communication signal is at a first value, and to store a portion of said extracted power sufficient to maintain the communication controller and the user interface in an operational state during a communication foreign object detection time interval, a power receiving coil 107 for extracting power from the power transfer signal, a foreign object detection controller 411 for reducing a load of the power receiver during a transfer foreign object detection time interval, a message transmitter 413, 407 for transmitting the first message to the power transmitter. The power receiver may also comprise a user interface which may be more or less complex (e,g, from simple LEDs to a display).

Frequently, the first value will be higher than the second value and the second value will be zero or substantially zero.

Thus the method of operating a power transmitter 101 wirelessly providing power to a power receiver 105 via an inductive power transfer signal, the power transmitter 101 comprises generating a communication control signal, wherein the communication control signal is set to a first value during the communication period and to set second value during a first foreign object detection time interval, the first foreign object detection time interval occurring during the communication period, generating a communication signal by applying the communication signal to a communication field, generating a power transfer signal, generating a drive signal for a transmitter coil (103), wherein during a power transfer phase, the drive signal employs a repeating time frame comprising at least a power transfer time interval and a second foreign object detection time interval, and performing a foreign object detection test during the first and second foreign object detection time intervals and receiving messages from the power receiver 105. On the power receiver 105 side, the method of operating the power receiver 105 for receiving power wirelessly via an inductive power transfer signal comprises receiving a received communication signal via a communication coil 107, decoding the received communications signal and generating a communication response signal for the communication coil 107, extracting power from the received communication signal and powering the communication controller 413, 407, 409 and a user interface, and storing a portion of said extracted power sufficient to maintain the communication controller and the user interface in an operational state during a first foreign object detection time interval, extracting power from the power transfer signal using a power transfer coil 107, reducing a load of the power receiver during a second foreign object detection time interval and transmitting a message to the power transmitter via the communication coil.

A convenient way of performing the FOD is by applying a signal in order to observe the damping of the oscillations in the resonant circuit. From the damping, the real part of the reactance of the system can be estimated. Since the real part of the reactance represents the amount of power absorbed by the system, from it the presence of a foreign object can be determined. To do this successfully, a number of cycles is needed and the more of these (i.e. the longer the test), the more accurate it is.

FIG. 10 illustrates time intervals during a communication 601 according to a further embodiment. The communication phase 601 may commence with a first (initial) communication interval 1001. This first communication interval 1001 is followed by a longer FOD time interval 1003. Then follow communication intervals 1005 and shorter FOD time intervals 1007. The longer communication foreign object detection time intervals are longer than the shorter foreign object detection time intervals. The longer FOD time interval 1003 may be used for an accurate FOD test and/or for adaptation/calibration of the FOD system to be used by FOD tests such as the FOD tests performed later in the communication phase 601 or the FOD tests of the power transfer phase 603. Other measurements such as coupling coefficient may be made and the results used later. The shorter FOD time intervals 1007 may be used for quicker checks for the presence of foreign objects. For example, this may be using calibration data acquired during the longer FOD time interval (where applicable) and/or it may be by using a quicker (but possibly less accurate) method. The longer FOD time interval may be 100 ms or less and the shorter FOD time intervals may be 10 ms or less and would typically be about 2 ms long. The values will allow for variations across systems such as difference in the actual resonance frequencies or noise levels in the measurement circuitry. So that the user does not experience a noticeable delay should they wish to start using the appliance immediately upon placing it on the power transmitter 101, it may be convenient to complete the longer FOD test within (approximately) 200 ms of starting the connection. An advantage of using the long and shorter FOD time intervals can be that more FOD time intervals can be used whilst not reducing the communication field's duty cycle too much, as compared to using FOD test methods which require longer intervals.

It may be useful to compare the results from the shorter FOD time intervals. Where the results deviate by more than a threshold value from each other, another longer FOD time interval could be used. An example of this comparison and threshold could be to require the measurement results from a series of short FOD tests to lie within band of ±five percent of their mean result.

It may be understood that the power transmitter 101 and power receiver 105 may also perform a negotiation during the start of the communication phase 601 as to the timing, frequency and/or duration of FOD time intervals 903, 1001, 1005 to occur during the communication phase 601. This allows the system 101 to set the FOD testing frequency (or duration) as high as possible whilst allowing some margin in the operation of the energy harvesting.

It may be understood that the communication units 207, 413 and their respective coils 209, 415 may also be used for other measurements besides foreign object detection. It may be possible to use them for measuring coupling factors. Such measurements could be performed during the FOD time intervals 903, 1003, 1005 occurring during the communication phase 601. This may have the benefit of allowing more precise adjustment of the power signal. Where the FOD tests of the power transfer phase 603 are performed using either one or both of a communication unit 207 or a dedicated FOD tester 213, this hardware could also be used for coupling factor measurements. This would have the advantage of assisting in the power control, for example be detecting that the appliance has been moved slightly. This could be achieved by having the power receiver 105 indicate a maximum number of FOD time intervals it is able to support and then having the power transmitter 101 conform to that.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

It will be appreciated that the reference to a preferred value does not imply any limitation beyond it being the value determined in the foreign object detection initialization mode, i.e. it is preferred by virtue of it being determined in the adaptation process. The references to a preferred value could be substituted for references to e.g. a first value.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. A power transmitter comprising:
   a power transfer coil, wherein the power transfer coil is configured to generate a power transfer signal;
   a driver circuit,
      wherein the driver circuit is configured to generate a drive signal for the power transfer coil,
      wherein the drive signal comprises a communication phase and power transfer phase,
      wherein the communication phase comprises at least one communication intervals and at least one foreign object detection intervals,
      wherein the power transfer phase comprises at least one power intervals and at least one communication detection intervals;
   a foreign object detector, wherein the foreign object detector is arranged to perform a foreign object detection test during the at least one foreign object detection intervals and during the at least one communication detection intervals;
   a communication coil, wherein the communication coil is configured to generate a communication signal; and
   a communication circuit, wherein the communication circuit is configured to generate a communication control signal for the communication coil,
      wherein the communication circuit is arranged to provide the communication control signal during the communication phase,
   wherein the power transfer signal is not sent during the communication phase,
   wherein the communication circuit is configured to set the communication control signal to a first value during the communication phase and to set the communication control signal to a second value during a first communication detection interval of the at least one communication detection intervals.

2. The power transmitter of claim 1,
   wherein the drive signal comprises a plurality of communication detection intervals,
   wherein the plurality of communication detection time intervals have different sizes.

3. The power transmitter of claim 2,
   wherein a portion of the at least one communication detection intervals has a length of less than or equal to 100 milliseconds,
   wherein a portion of the at least one communication detection intervals has a length of less than or equal to 10 milliseconds,
   wherein a portion of the at least one communication detection intervals occur with a period of 200 milliseconds.

4. The power transmitter of claim 2, wherein a first communication detection interval of the at least one commination detection intervals is completed within 200 milliseconds of an establishment of communication with a power receiver.

5. The power transmitter of claim 1,
   wherein the power transmitter is arranged to be powered by an electricity supply,
   wherein the electricity supply comprises zero-crossing points and
   wherein the a portion of the least one detection communication intervals are arranged to be synchronized with at least one zero crossing point.

6. The power transmitter of claim 1, wherein the first value of the communication signal is set so as to transfer enough power to a communication signal power harvester circuit in a power receiver.

7. The power transmitter of claim 1, wherein the second value of the communication signal is set so as to reduce interference with a foreign object detection test.

8. The power transmitter of claim 7, wherein the communication circuit performs the foreign object detection test.

9. The power transmitter of claim 1, wherein the power transmitter is arranged to negotiate the frequency and/or duration of the at least one foreign object detection intervals during the communication phase.

10. A method of operating comprising:
   generating a communication signal during a communication phase,
      wherein the communication phase does not comprise a power transfer signal,
      wherein the communication phase comprises at least one communication intervals and at least one foreign object detection intervals,
      wherein the communication signal is set to a first value during the communication phase,
      wherein the communication signal is set to a second value during a first communication detection interval,
      wherein the first communication detection interval occurs during the communication period;
   applying the communication signal to a communication field;
   generating the power transfer signal;
   generating a drive signal for a transmitter coil,
      wherein the drive signal comprises a communication phase and power transfer phase,
      wherein the communication phase comprises at least one communication intervals and at least one foreign object detection intervals,
      wherein the power transfer phase comprises at least one power intervals and at least one communication detection intervals, and
   performing a detection test during the first communication detection interval and the second communication detection interval; and
   receiving messages.

11. A computer program stored on a non-transitory medium, wherein the computer program when executed on a processor performs the method as claimed in claim 10.

12. The method of claim 10,
   wherein the communication period comprises a plurality of communication detection intervals,
   wherein the plurality of communication detection time intervals have different sizes.

* * * * *